United States Patent [19]
Jenista et al.

[11] Patent Number: 5,126,945
[45] Date of Patent: Jun. 30, 1992

[54] NONFERROUS EXTRUSION PROCESS CONTROL SYSTEM

[75] Inventors: David R. Jenista, Wyoming; Todd A. Buiten, Grand Rapids, both of Mich.

[73] Assignee: Granco Clark, Inc., Grand Rapids, Mich.

[21] Appl. No.: 480,031

[22] Filed: Feb. 14, 1990

[51] Int. Cl.$^5$ .............................................. G06F 15/46
[52] U.S. Cl. ........................................ 364/468; 72/8;
72/274; 364/472; 364/476
[58] Field of Search ............... 364/468, 478, 401, 402,
364/403, 131-135, 472, 200 MS File, 900 MS
File, 474.11, 476; 72/6-9, 274, 275, 277, 278,
279, 280

[56] References Cited
U.S. PATENT DOCUMENTS

| | | | |
|---|---|---|---|
| 4,561,060 | 12/1985 | Hemond | 364/468 X |
| 4,648,023 | 3/1987 | Powell | 364/468 X |
| 4,698,766 | 10/1987 | Entwistle et al. | 364/468 |
| 4,796,194 | 1/1989 | Atherton | 364/468 |
| 4,827,423 | 5/1989 | Beasley et al. | 364/131 X |
| 4,887,218 | 12/1989 | Natarajan | 364/478 X |

OTHER PUBLICATIONS

Gentry, "Extrusion Plant Automation-Ready or Not", *Light Metal Age*, pp. 5-6 (Jun. 1986).
Bugai, "'CIEM': Computer Integrated Extrusion Manufacturing", pp. 223-228 (Published Apr. 11, 1988).
Gentry, "Control the Automated Extrusion Process With the Supervisory Computer", pp. 229-234 (Published Apr. 11, 1988).
Brochure entitled "Supervisory Computer System . . . A Revolutionary Approach to the Aluminum Extrusion Manufacturing Process", published by Granco Clark on Apr. 11, 1988.

*Primary Examiner*—Joseph Ruggiero
*Attorney, Agent, or Firm*—Warner, Norcross & Judd

[57] ABSTRACT

A control system is provided for coordinating and monitoring material flow through a nonferrous extrusion facility. The system maintains first-in/first-out queues between stations within the facility to improve tracking of the material through the process. The extrusion equipment is controlled in response to the queues and to stored job information to move the material efficiently and automatically through each station within the facility.

11 Claims, 4 Drawing Sheets

NONFERROUS EXTRUSION PROCESS CONTROL SYSTEM

BACKGROUND OF THE INVENTION

The present invention relates to nonferrous extrusion equipment, and more particularly to a control system for coordinating and monitoring the movement of material through such equipment.

A typical nonferrous extrusion line, such as those used in extruding aluminum, typically consists of four processing stations and three transition areas. The processing stations are the furnace/shear station, the press/puller station, the stretcher station, and the saw station. The transition areas are the transveyor/loader area, the cooling table area, and the batching table area. The transition areas separate the processing stations so that material flows through the facility in the following order: furnace or furnace/shear, transveyor/loader, press/puller, cooling table, stretcher, batching table, and saw. In the processing stations, the equipment has contact with the metal and can track the material easily. Tracking is difficult in the transition areas because material is added to and removed from each transition area at different rates.

In the furnace/shear station, billets of raw material are preheated. In a furnace/shear, the billets are also cut to length for extruding. The heated, sized billets are then carried by the transveyor/loader into the extrusion press. The press forces the softened material through an extrusion die to produce an elongated extrusion having a uniform cross-section throughout its length. Because the material exiting the press is not rigid, pullers are used to facilitate transporting the material away from the extrusion press. The pullers draw the material on to a cooling table where the extruded material cools. The extrusions are then stretched to exert a longitudinal force on the extrusions. Due to the structural properties of the metal, stretching straightens and rigidifies the extrusion. The stretched extrusions are then accumulated on a batching table into batches, which are forwarded to the saw for cutting. The processed extrusions are then finished and/or stored for subsequent supply.

The transition areas hold varying amounts of material throughout operation of the system. Each of the furnace/shear, press/puller, and stretcher stations deposits material into the subsequent transition area at a dynamic rate. Similarly, each of the press/puller, stretcher, and saw stations removes material from a transition area at a dynamic rate. For example, one, two, three, four, or even more extrusions can be fabricated simultaneously from a single press cycle depending on the die configuration. Similarly, the stretcher and saw may operate on only a single extrusion at a time or up to four or more extrusions at a time.

As can be readily appreciated, the amount of material in the transition areas varies dynamically with the operation of the system. Since different "jobs" for different pieces are run sequentially through the system, a "steady state" of material flow through the transition areas is the exception rather than the rule.

Prior computer control for extrusion operations are unsophisticated by today's standards. Typically, a programmable logic controller (PLC) is provided in conjunction with each processing station. A first PLC is provided for the furnace/ shear, a second for the press/puller, and a third for the stretcher and saw. The PLC's are each operated by human operators, who observe conditions at their individual stations and input commands into the PLC to control the equipment. Papers must be transported throughout the extrusion facility to inform the operators of the approaching jobs. Such a "paper trail" passes from operator to operator as the extrusion passed through the system. The operator must then recognize the material within the transition area approaching his station and take the appropriate action to properly process the material. Obviously, even the smallest of manufacturing mistakes can result in substantial losses of entire jobs or batches of material. These problems are further complicated when different jobs or orders share the same extrusion cross-section and length. In such case, the only way to determine the division between the orders is to maintain a physical count of the extrusions in each transition area.

SUMMARY OF THE INVENTION

The aforementioned problems are overcome in the present invention which provides an automated control system for the entire extrusion manufacturing process. Particularly, the present control system provides dynamic queues to keep track of material within the transition areas and to monitor and control the movement of material through the system.

More specifically, the control system includes means for providing an independent, dynamically alterable queue at each of the transveyor/loader, cooling table, and batching table transition areas. The control system monitors for movement of material into and out of each of these areas and updates the queue in response to such material flow. Accordingly, the control system knows precisely what material is in each transition area and can therefore issue commands to equipment and maintain records on the status of jobs. Preferably, all material moving through the system is identified by a job number so that any manufacturing variables can be stored therewith for subsequent analysis. Further preferably, each of the queues is a FIFO (first-in/first-out) queue to be compatible with the sequential flow of material through the entire system including the transition areas.

Each queue represents material in a different form. The transveyor queue loads or unloads one billet for each operation. The cooling queue loads one or more extrusions for each press operation depending on the configuration of the extrusion die and unloads one or more extrusions for each stretcher operation depending on the number of extrusions stretched simultaneously. The batch queue loads individual extrusions and unloads a batch made up of a number of extrusions capable of being processed through the saw station together.

The present system eliminates the necessity of either physically or visually tracking the material in the transition areas or indeed through the entire system. Each upstream processing station sends materials to a transition area having a unique queue. Each downstream processing station reads the transition queue for new material.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
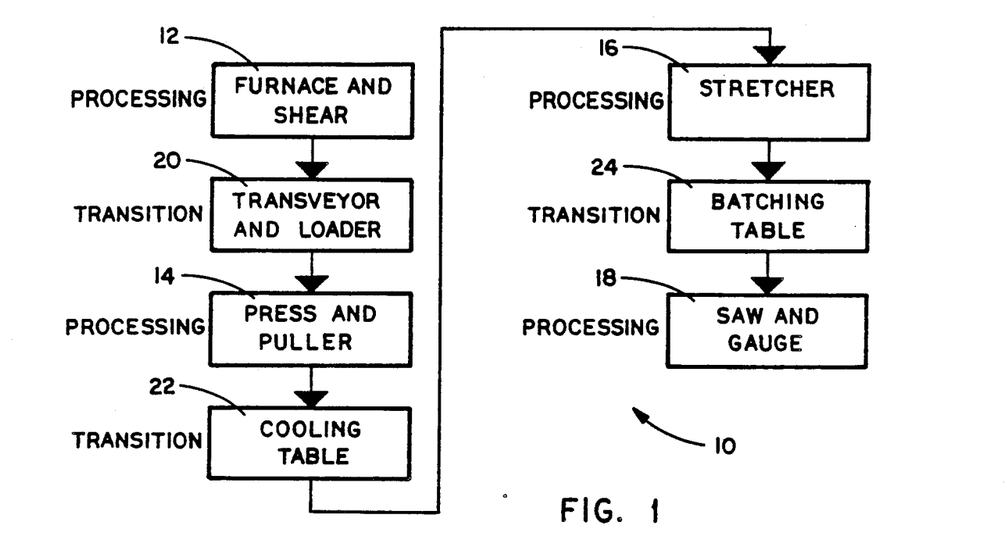
FIG. 1 is a schematic diagram of the stations and transition areas within an extrusion facility.

The layout of a nonferrous extrusion facility is schematically illustrated in FIG. 1. Nonferrous extrusions are typically aluminum, although a wide variety of other metals and/or their alloys may be used.

Generally speaking, the facility 10 includes four processing stations interspersed by three transition areas. The processing stations are the furnace/shear station 12, the press/puller station 14, the stretcher station 16, and the saw station 18. The transition areas are the transveyor/loader area 20, the cooling table area 22, and the batching table area 24.

All of the components illustrated in FIG. 1 are generally well known to those having ordinary skill in the nonferrous extrusion art. For example, the components can be those sold as the following models manufactured by the following companies:

| Station/Area | Manufacturer | Model |
| --- | --- | --- |
| Furnace/Shear | Granco Clark | 69-35-3/ 7/9-130-RC-R-B |
| Press/Puller | Sutton/Granco Clark | 2500 ton/ 1000 lb. Double Puller |
| Stretcher | Granco Clark | 50 ton UNISLIDE |
| Saw | Granco Clark | ECS-408 |
| Transveyor/Loader | Granco Clark | N/A |
| Cooling Table | Granco Clark | N/A |
| Batching Table | Granco Clark | N/A |

Of course, substitute equipment can, and often is, mixed and/or substituted for the exemplary equipment identified above.

Briefly summarizing, the furnace/shear station 12 preheats the raw aluminum billets to soften the metal for subsequent extrusion. The transveyor/loader 20 conveys the preheated sheared billets to the press/puller 14. The press extrudes the softened material through an extrusion die to produce an elongated piece having a generally uniform cross-section. The puller attaches to the extrusion as the extrusion exists the die to assist in drawing the extrusion onto the cooling table 22. After a cooling period, the extrusions then pass to the stretcher 16 which exerts a pulling force longitudinally on the extrusions to set the extruded metal. The stretched extrusions are then accumulated on a batching table 24 for subsequent conveyance to the saw 18, which cuts the extrusions to the desired length.

Figure 2:
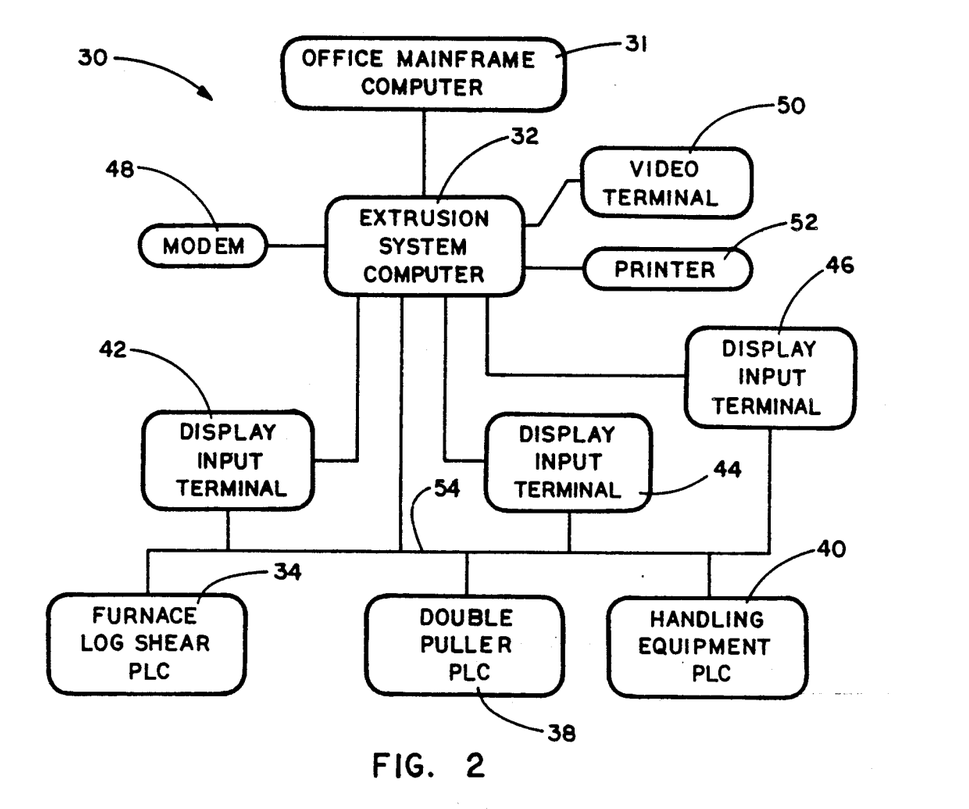
FIG. 2 is a schematic diagram of the computer control system of the present invention.

The computer control system of the present invention is illustrated in FIG. 2 and generally designated 30. Generally, the control system includes an office mainframe computer 31, a supervisory computer 32, a plurality of programmable logic controllers (PLC's) 34, 38, and 40; and a plurality of display/input terminals 42, 44, and 46.

The office mainframe computer 31 can be virtually any general purpose digital computer and, in the preferred embodiment, is that sold as model AS400 by International Business Machines of Binghamton, N.Y. The information in this computer is inputted and maintained by the clerical staff. In particular, each job or order to be processed through the system for a customer is inputted into the computer 31.

The supervisory computer 32 can be virtually any general purpose digital computer and, in the preferred embodiment, is that sold as model MICROVAX 3100 by Digital Equipment Corporation of Maynard, Mass. A modem 48, a video terminal 50, and a printer 52 are connected to the supervisory computer 32 for input and output in conventional fashion. The supervisory computer 32 reads job information from the office mainframe computer 31, prioritizes the jobs to be run, and communicates with the PLC's as will be described to process material through the facility 10.

The programmable logic controllers (PLC's) 34, 38, and 40 are known to those having ordinary skill in the nonferrous extrusion art. In the preferred embodiment, the PLC's are those sold as model 5/25 by Allen-Bradley of Cleveland, Ohio. The PLC's are tied to both the supervisory computer 32 and the display/input terminals 42–46 by a network 54. The network of the presently preferred embodiment is that sold by Allen-Bradley under the trademark DATA HIGHWAY.

Display/input terminals 42–46 are also generally well known to those having ordinary skill in the nonferrous extrusion art. The terminals of the preferred embodiment are those sold as model T30G by Allen-Bradley of Cleveland, Ohio. The terminals permit the display of logic functions and/or operations of the various PLC's. The terminals also permit manual input by human operators within the facility 10 to indicate when material is removed from the system.

Although the PLC's 34, 38, and 40 and the terminals 42–46 are generally known to those having skill in the nonferrous extrusion art, they have not heretofore been controlled by a supervisory computer such as 32. The PLC's have been used in a rather unsophisticated manner. Specifically, an operator at each terminal 42–46 observes the operation of the system and inputs the required commands to the PLC's depending on a paper job order which he has received for each job moving sequentially through the system.

The present invention utilizes the time-tested and reliable PLC's to provide total system integration and computer control of material moving through the system. The supervisory computer 32 receives signals from the PLC's 34, 38, and 40 indicating when materials are entering and leaving processing stations and therefore also indicating when materials are entering and leaving transition areas. The computer 32 maintains an independent queue for each transition area by monitoring material entering the area and material exiting the area and updating the queue accordingly. The computer 32 can then issue appropriate commands to the processing stations via the PLC's 34, 38, and 40 to continue processing of the material.

Figure 4:
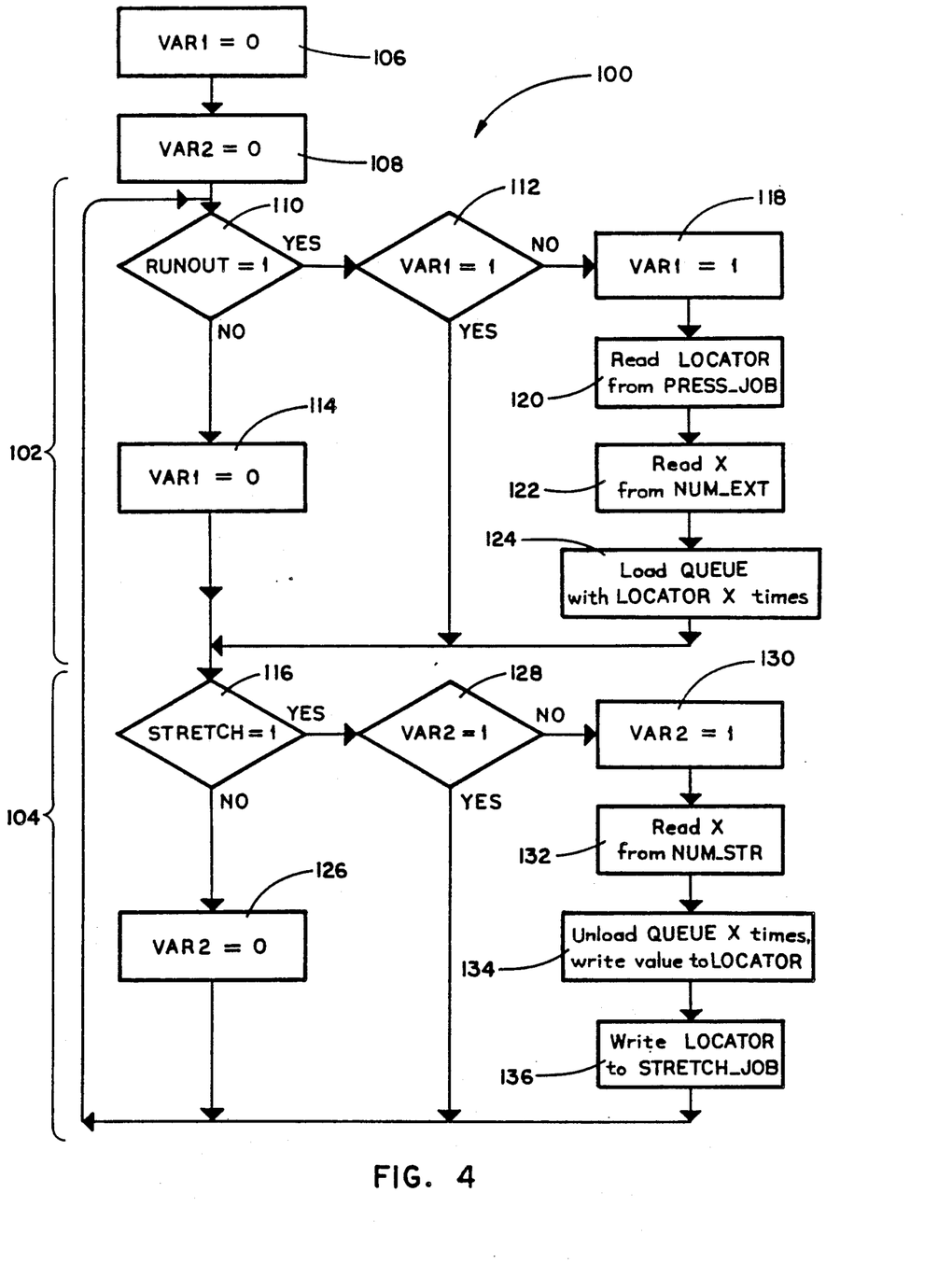
FIG. 4 is a flow chart of the computer program used to maintain the cooling table queue.
Figure 5:
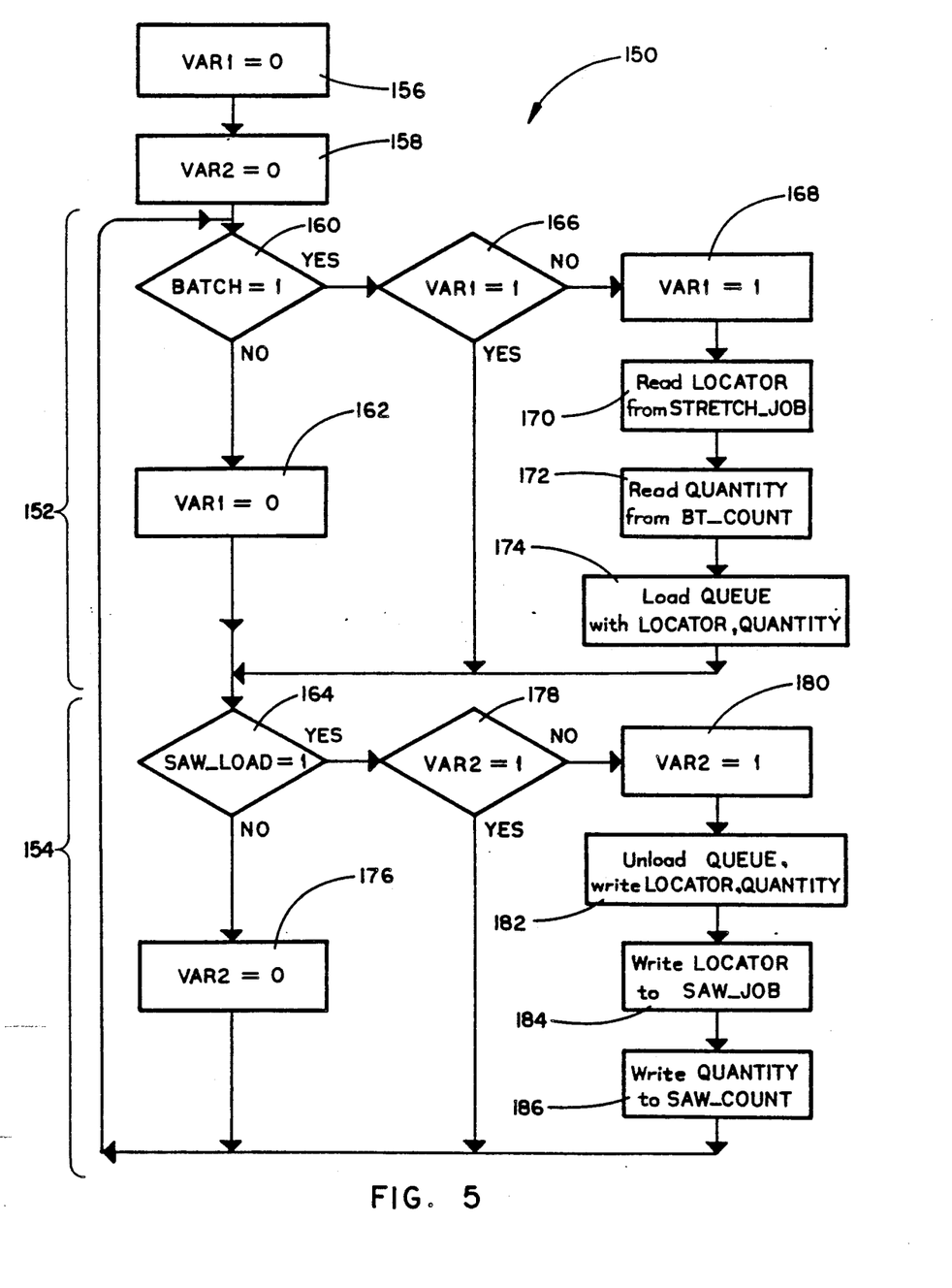
FIG. 5 is a flow chart of the computer program used to maintain the batching table queue.

The use of the supervisory computer 32 in conjunction with the PLC's enables the collection of information necessary to update the queue information. The program flow charts for the software maintaining the three queues is illustrated in FIGS. 3–5.

All three queues are first-in/first-out (FIFO) queues to represent the flow of material sequentially through the system 10 and hence through each of the transition areas. Material exits each transition area in the same order in which it entered the transition area. Minor exceptions exist for material manually removed from the system, and such manual changes are manually inputted via the display/input terminals 42-46.

Figure 3:
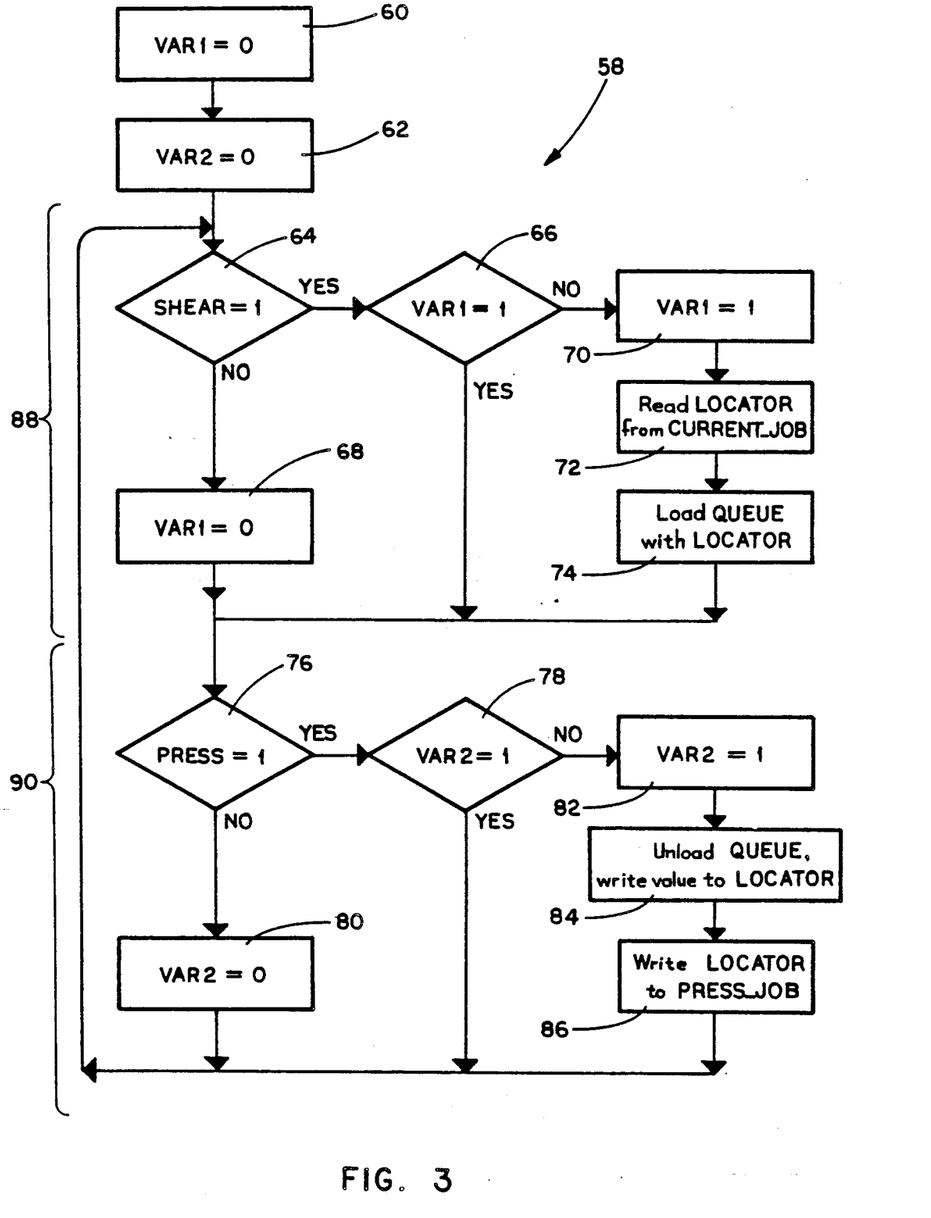
FIG. 3 is a flow chart of the computer program used to maintain the transveyor/loader queue.

FIG. 3 illustrates the program flow for the software 58 maintaining the transveyor/loader (or transveyor) queue. In the transveyor queue program 58, the following variables have the following values:

| Variable | Value |
| --- | --- |
| VAR1 | One if queue updated in response to most recent shear signal and zero otherwise |
| VAR2 | One if queue updated in response to most recent press cycle complete signal and zero otherwise |
| SHEAR | One upon completion of shearing and zero otherwise |
| PRESS | One while press is extruding a billet and zero otherwise |
| QUEUE | FIFO memory queue (each entry is a discrete 5-digit number representing a job in the production schedule) |
| LOCATOR | Temporary storage for a job identification number |
| CURRENT_JOB | Current job number from the production schedule |
| PRESS_JOB | Job number active at the press |

When the system is initiated, both of the variables VAR1 and VAR2 are set 60, 62 to zero. The program 58 then monitors the status of the SHEAR and PRESS signals. A decision 64 is made depending on the value of the SHEAR variable. If SHEAR has a value of one indicating that a billet has been sheared, program flow passes to decision 66. If variable SHEAR has a value of zero, indicating that a new billet has not yet been sheared, VAR1 is set 68 to zero and program flow passes to block 76 to check the press signal. Returning to block 66, if VAR1 is equal to one, indicating that the queue has already been updated, program flow passes to check the press signal. If the queue has not already been updated in response to the shear signal, VAR1 is set to one 70; the current job number is placed 72 in LOCATOR; and the value of LOCATOR (i.e. the current job number) is loaded 74 into the FIFO queue.

Program flow then continues to block 76 to check the press signal. If the PRESS variable is equal to one, indicating that the press is extruding a billet, program flow passes to block 78. If the press signal is other than one, indicating that the press is not extruding, VAR2 is set to zero 80 and program flow returns to block 64 to again check the status of the shear flag. Returning to block 78, if VAR2 equals one, indicating that the queue has been updated, program flow returns to block 64. If the queue has not been updated, VAR2 is set 82 to one; the FIFO queue is unloaded 84 of one job number which is stored in LOCATOR; and the job number within LOCATOR (i.e. the job number unloaded from the queue) is placed 86 is PRES_JOB.

Accordingly, the upper portion 88 of the program 58 (as viewed in FIG. 3) monitors for the transition of billets from the furnace/shear station to the transveyor/loader area and updates the FIFO queue when a billet is so transferred. The lower portion 90 of the program 58 monitors for movement of billets from the transveyor/loader transition area to the press and removes the billet-associated information from the FIFO queue when the transition is noted.

FIG. 4 illustrates the program flow for the computer program 100 maintaining the cooling table queue (or cooling queue). The cooling queue program 100 closely parallels the transveyor queue program 58 (see FIG. 3); and their functions are therefore similar. The upper portion 102 of the program 100 (as viewed in FIG. 4) monitors for arrival of extrusions on the cooling table, and the lower portion 104 of the program 100 monitors for departure of extrusions from the cooling table.

The following variables have the following values in the program 100:

| Variable | Value |
| --- | --- |
| VAR1 | Variable used to control load queue loop |
| VAR2 | Variable used to control unload queue loop |
| QUEUE | FIFO memory queue (each entry is a discrete five-digit number representing a job in the production schedule) |
| LOCATOR | Temporary storage for a job identification number |
| RUNOUT | Signal from the PLC when extrusions leave the press area |
| STRETCH | Signal from the PLC that a stretch cycle is occurring |
| NUM_EXT | Number of extrusions produced each press cycle |
| NUM_STR | Number of extrusions stretched each stretcher cycle |
| PRESS_JOB | Job number active at the press |
| STRETCH_JOB | Job number active at the stretcher |

Upon start-up of the supervisory computer 32, VAR1 and VAR2 are both initialized 106 and 108 to zero. In block 110, the RUNOUT variable is evaluated. If the RUNOUT variable is one, an extrusion has left the press and control is transferred to block 112. If RUNOUT is not equal to one, indicating that an extrusion has not yet left the press, VAR1 is set 114 to zero and program flow continues to block 116. Returning to block 112, VAR1 is checked. If VAR1 is not equal to one, indicating that the queue has already been updated in response to the run-out signal, program flow passes to block 116 If VAR1 is equal to zero, indicating that the queue has not yet been updated, VAR1 is set 118 to one; the variable LOCATOR is loaded 120 with PRESS_JOB (i.e. the job active at the press); the variable X is loaded 122 with the value NUM_EXT; and the queue is updated X times with the variable LOCATOR. Since NUM_EXT indicates the number of extrusions which will be delivered to the cooling table from a single extrusion press, the queue includes one entry for each of the extrusions on the extrusion table.

Program flow then continues to block 116, where the value of STRETCH is monitored. If it is not equal to one, indicating that a stretch is not occurring, VAR2 is set 126 to zero and control returns to block 110. If STRETCH is equal to one, indicating that a stretch is occurring, program flow passes to block 128 to determine whether the queue has been updated. If VAR2 is not equal to one, the queue has been updated; and program flow continues to block 110. If VAR2 is not equal to one, indicating that the queue has not been updated, VAR2 is set 130 to one; the variable X is loaded 132 with the value NUM_STR; the queue is unloaded 134 X times with the unloaded value being stored in LOCATOR; and the value in LOCATOR is transferred 136 to the variable STRETCH_JOB. Program flow then returns to block 110 to again check the RUNOUT variable. The queue is unloaded one time for each extrusion going to the stretcher.

FIG. 5 illustrates the flow chart for the batching table queue (or batch queue) program 150. As with the cooling queue program 100, the batch queue program 150 is generally similar to the transveyor queue program 58. The upper portion 152 of the program 150 (as viewed in FIG. 5) monitors for arrival of material on the batching table and updates the queue accordingly; and the lower portion 154 of the program 150 monitors for departure of material from the batching table and again updates the queue accordingly.

The following variables have the following values in the batch queue program 150:

| Variable | Value |
| --- | --- |
| VAR1 | Variable used to control load queue loop |
| VAR2 | Variable used to control unload queue loop |
| QUEUE | FIFO memory queue (each entry is a discrete five-digit number representing a job in the production schedule) job identification number |
| LOCATOR | Temporary storage for a job identification number |
| QUANTITY | Temporary storage for the quantity in the batch to be sent to the saw |
| BATCH | Signal from the machinery when a batch is completed |
| SAW_LOAD | Signal from the machinery that the saw has loaded a batch |
| STRETCH_JOB | Job number active at the stretcher |
| SAW_JOB | Job number active at the saw |
| BT_COUNT | Number of extrusions in the batch that the stretcher created |
| SAW_COUNT | Number of extrusions that are currently being cut |

Upon initiation of the supervisory computer 32, VAR1 and VAR2 are initialized 156 and 158 to zero.

Program flow then passes to block 160, where the variable BATCH is checked. If BATCH is not equal to one, indicating that stretching is not complete, VAR1 is set 162 to zero and program flow continues to block 164. If BATCH is equal to one, indicating that stretching is complete, program flow passes to block 166 to check the variable VAR1. If VAR1 is equal to one, indicating that the queue has already been updated in response to the changed BATCH signal, program flow passes directly to block 164. If VAR1 is not equal to one, indicating that the queue has not been updated in response to the changed batch signal, VAR1 is set 168 to one; the variable LOCATOR is given 170 the value in STRETCH_JOB; the variable QUANTITY is given 172 the value in BT_COUNT; and the QUEUE is loaded 174 with the variables LOCATOR and QUANTITY. Program flow then passes to block 164.

In block 164, the variable SAW_LOAD is checked. If the variable is not equal to one, indicating that the saw is not loaded, VAR2 is set 176 to zero and program flow passes to block 160. If the variable SAW_LOAD is equal to one, indicating that the saw is loaded, control passes to block 178 wherein the variable VAR2 is checked. If VAR2 is equal to one, indicating that the QUEUE has already been updated in response to the changed SAW_LOAD variable, control passes to block 160. If VAR2 is not equal to one, indicating that the QUEUE has not been updated in response to the changed SAW_LOAD signal, VAR2 is set 180 to one; the QUEUE is unloaded 182 to the variables LOCATOR and QUANTITY; the variable LOCATOR is written to SAW_JOB to identify the job delivered to the saw; and the variable QUANTITY is written 186 to the variable SAW_COUNT indicating the number of extrusions sent to the saw. Program flow then continues to block 160 to again check the status of arrivals.

The computer control system 30 approximates the arrival and departure of materials to and from each transition area by utilizing PLC signals available in the existing art. Specifically, arrivals in the transveyor area are approximated by the sensing of the shear signal; departures from the transveyor area are approximated by a signal indicating that the press is extruding a billet; arrivals in the cooling table area are approximated by sensing that extrusions have left the press area; departures from the cooling table area are approximated by sensing that a stretch cycle is occurring; arrivals in the batching table area are approximated by sensing the completion of a stretching cycle; and departures from the batching table are approximated by sensing that the saw is loaded. Of course, other approximations and/or sensing mechanisms can be used to physically monitor the movement of material through the system. The present invention economizes by using signals already available in the art.

The present invention accurately and efficiently monitors the movement of all material through the entire extrusion process. Whereas prior systems were capable only of detecting material presence at processing stations, the present invention additionally monitors and tracks all material within transition areas. Human operators only oversee the automated system to insure proper function and to take appropriate corrective action only if required. The system improves automatation of the extrusion function and improves the accuracy of all material handling throughout the system.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A nonferrous extrusion facility control system, the facility including a furnace station, a transveyor, a press station, a cooling table, a stretcher station, a batching table, and a saw station through which material is subsequently processed, the control system comprising:

computer means for storing job information regarding jobs to be processed through said facility, the information including for each job a job identification, the number of extrusions produced on each cycle of the press station, the number of extrusions to be stretched simultaneously by the stretcher station, and the number of stretched extrusions to be batched and sent simultaneously to the saw station;

transveyor queue means for maintaining a transveyor queue within said computer means of material on the transveyor, the transveyor queue including an entry for each billet on the transveyor, said transveyor queue means including sensor means for sensing the arrival of materials to the transveyor from the furnace station and the departure of materials from the transveyor to the press station, the queue entry for each billet including the job identification associated with the billet;

cooling table queue means for maintaining a cooling table queue within said computer means of material on the cooling table, said cooling table queue including an entry for each extrusion on the cooling table, said cooling table queue means including sensor means for sensing the arrival of materials on the cooling table from the press station and the departure of materials off the cooling table to the stretcher station, the queue entry for each extrusion including the job identification associated with the extrusion; and batching table queue means for maintaining a batching table queue within said computer means of material on the batching table, the batching table queue including an entry for each extrusion on the batching table, said batching table queue means including sensor means for sensing the arrival of materials on the batching table from the stretcher station and the departure of materials off the batching table to the saw station, the queue entry for each extrusion including the job identification associated with the extrusion, said computer means having access to all of the queues and the job information to control the operation of the stations within the extrusion facility.

2. A control system as defined in claim 1 wherein said transveyor queue sensor means includes means for sensing the shearing of a billet in the furnace station and for sensing the completion of a press cycle in the press station.

3. A control system as defined in claim 1 wherein said cooling table queue sensor means includes means for sensing the completion of an extrusion cycle of the press station and for sensing that the stretcher station has initiated a stretching cycle.

4. A control system as defined in claim 1 wherein said batching table queue sensor means includes means for sensing that a stretching cycle has been completed by said stretching station and for sensing that the saw station is loaded.

5. A control system as defined in claim 1 wherein all of said sensor means include program logic controllers.

6. A control system as defined in claim 1 wherein said computer means comprises a single control computer.

7. The control system as defined in claim 1 wherein each of the queues is a first-in/first-out queue.

8. The control system as defined in claim 1 further comprising terminal means associated with each of said queue means for manually entering information to update the queues in response to removal of material from the facility.

9. A control process for a nonferrous extrusion facility comprising;

storing information in a computer means regarding jobs to be processed through the facility, the information including for each job a job identifier, the number of extrusions produced on each cycle of the extrusion press, the number of extrusions to be stretched simultaneously by the stretch, and the number of stretched extrusions to be batched and sent simultaneously to the saw;

maintaining a transveyor queue in the computer means for the billets in the transveyor area, the transveyor queue including a record for each billet, said maintaining step including determining when a billet enters the transveyor area and automatically updating the queue record associated with the billet to reflect the arrival of the billet, said maintaining step further including determining when a billet leaves the transveyor area and automatically updating the queue record associated with the billet to reflect the departure of the billet;

maintaining a cooling table queue in the computer means for the extrusions in the cooling table area, the cooling table queue including a record for each extrusion, said maintaining step including determining when an extrusion enters the cooling table area and automatically updating the queue record associated with the extrusion to reflect the arrival of the extrusion, said maintaining step further including determining when an extrusion leaves the cooling table area and automatically updating the queue record associated with the extrusion to reflect the departure of the extrusion; and maintaining a batching table queue in the computer means for the extrusions in the batching table area, the batching table queue including a record for each extrusion, said maintaining step including determining when an extrusion enters the batching table area and automatically updating the queue record associated with the extrusion to reflect the arrival of the extrusion, said maintaining step further including determining when an extrusion leaves the batching table area and automatically updating the queue record associated with the extrusion to reflect the departure of the extrusion;

whereby the computer means can access all of the queues and the stored information to control the extrusion facility.

10. A control process as defined in claim 9 wherein each of said maintaining steps includes maintaining a first-in/first-out queue.

11. A control process as defined in claim 9 wherein all of said maintaining steps are carried out on a single central computer.

* * * * *

UNITED STATES PATENT AND TRADEMARK OFFICE
CERTIFICATE OF CORRECTION

PATENT NO. : 5,126,945

DATED : June 30, 1992

INVENTOR(S) : Jenista et al

It is certified that error appears in the above-identified patent and that said Letters Patent is hereby corrected as shown below:

Column 9, Claim 1, Line 1:
   "subsequently" should be --sequentially--

Signed and Sealed this

Twenty-fourth Day of August, 1993

Attest:

BRUCE LEHMAN

Attesting Officer
Commissioner of Patents and Trademarks